US012634192B2

(12) United States Patent
Ji

(10) Patent No.: US 12,634,192 B2
(45) Date of Patent: May 19, 2026

(54) CELLULAR SITE RESET TOOL BASED ON ALARMS OR USER INPUT FILE

(71) Applicant: T-Mobile USA, Inc., Bellevue, WA (US)

(72) Inventor: Rongjie Ji, Lisle, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 36 days.

(21) Appl. No.: 18/424,485

(22) Filed: Jan. 26, 2024

(65) Prior Publication Data

US 2025/0247285 A1     Jul. 31, 2025

(51) Int. Cl.
| | |
|---|---|
| *G06F 15/16* | (2006.01) |
| *H04L 41/0659* | (2022.01) |
| *H04L 41/0813* | (2022.01) |
| *H04L 41/22* | (2022.01) |

(52) U.S. Cl.
CPC ...... *H04L 41/0659* (2013.01); *H04L 41/0813* (2013.01); *H04L 41/22* (2013.01)

(58) Field of Classification Search
CPC .. H04L 41/22; H04L 41/0659; H04L 41/0813
USPC ......................................................... 709/223
See application file for complete search history.

(56) References Cited

U.S. PATENT DOCUMENTS

| | | | | |
|---|---|---|---|---|
| 8,779,919 | B1 * | 7/2014 | Darling ................. | G08B 25/004 |
| | | | | 340/539.16 |
| 9,143,222 | B2 * | 9/2015 | Miyata .................. | H04W 16/26 |
| 9,854,459 | B2 * | 12/2017 | Zhou ...................... | H04W 24/04 |
| 10,251,052 | B2 * | 4/2019 | Lee ........................... | H04W 8/22 |
| 11,201,786 | B2 * | 12/2021 | Shi .......................... | H04W 16/18 |
| 11,706,659 | B2 * | 7/2023 | Landernäs ........... | H04B 17/364 |
| | | | | 370/329 |
| 12,063,141 | B2 * | 8/2024 | Mishra ................ | H04L 41/0604 |
| 2005/0242948 | A1 * | 11/2005 | Tarr ....................... | G08B 25/10 |
| | | | | 340/539.22 |
| 2007/0053317 | A1 * | 3/2007 | Sormunen ............. | H04W 24/10 |
| | | | | 370/328 |
| 2014/0269251 | A1 * | 9/2014 | Zhou ...................... | H04W 24/04 |
| | | | | 370/242 |
| 2014/0295751 | A1 * | 10/2014 | Miyata ............... | H04B 7/15507 |
| | | | | 455/7 |
| 2019/0280928 | A1 * | 9/2019 | Shi ......................... | H04W 88/00 |
| 2022/0007228 | A1 * | 1/2022 | Landernäs ........ | H02J 13/00022 |
| 2022/0311656 | A1 * | 9/2022 | Vaishnavi ........... | H04L 41/0813 |
| 2023/0007514 | A1 * | 1/2023 | Park ...................... | H04W 24/04 |
| 2024/0007514 | A1 * | 1/2024 | Lang ....................... | H04S 3/002 |
| 2024/0095753 | A1 * | 3/2024 | Solanki ................... | H04L 41/22 |
| 2024/0235194 | A9 * | 7/2024 | Wan ....................... | H02J 7/0048 |
| 2025/0119760 | A1 * | 4/2025 | Khalid ................. | H04W 76/10 |

* cited by examiner

*Primary Examiner* — Moustafa M Meky
(74) *Attorney, Agent, or Firm* — Lee & Hayes, P.C.

(57) ABSTRACT

Techniques are described herein for detecting and mitigating alarm events on network equipment nodes. Such techniques may involve receiving status information associated with an equipment node and determining, based on the status information and stored alarm data, an alarm event associated with the equipment node. The techniques may further involve identifying, based on the stored alarm data, a resolution action associated with the alarm event, generating instructions associated with implementation of the resolution action, and providing the instructions to at least one electronic device to be executed.

14 Claims, 8 Drawing Sheets

700

RECEIVE STATUS INFORMATION FOR AN EQUIPMENT NODE
702

DETERMINE AN ALARM EVENT ASSOCIATED WITH THE EQUIPMENT NODE
704

IDENTIFY RESOLUTION ACTION ASSOCIATED WITH THE ALARM EVENT
706

GENERATE INSTRUCTIONS ASSOCIATED WITH IMPLEMENTATION OF THE RESOLUTION ACTION
708

PROVIDE INSTRUCTIONS TO SECOND ELECTRONIC DEVICE
710

300

400

OPERATION MANAGEMENT DEVICE 402

ADMINISTRATOR DEVICE 318

NETWORK MANAGEMENT DEVICE 306

OSS 304

EQUIP. NODE 302

404

406

408

410

412

414

416

418

420

Figure 5:
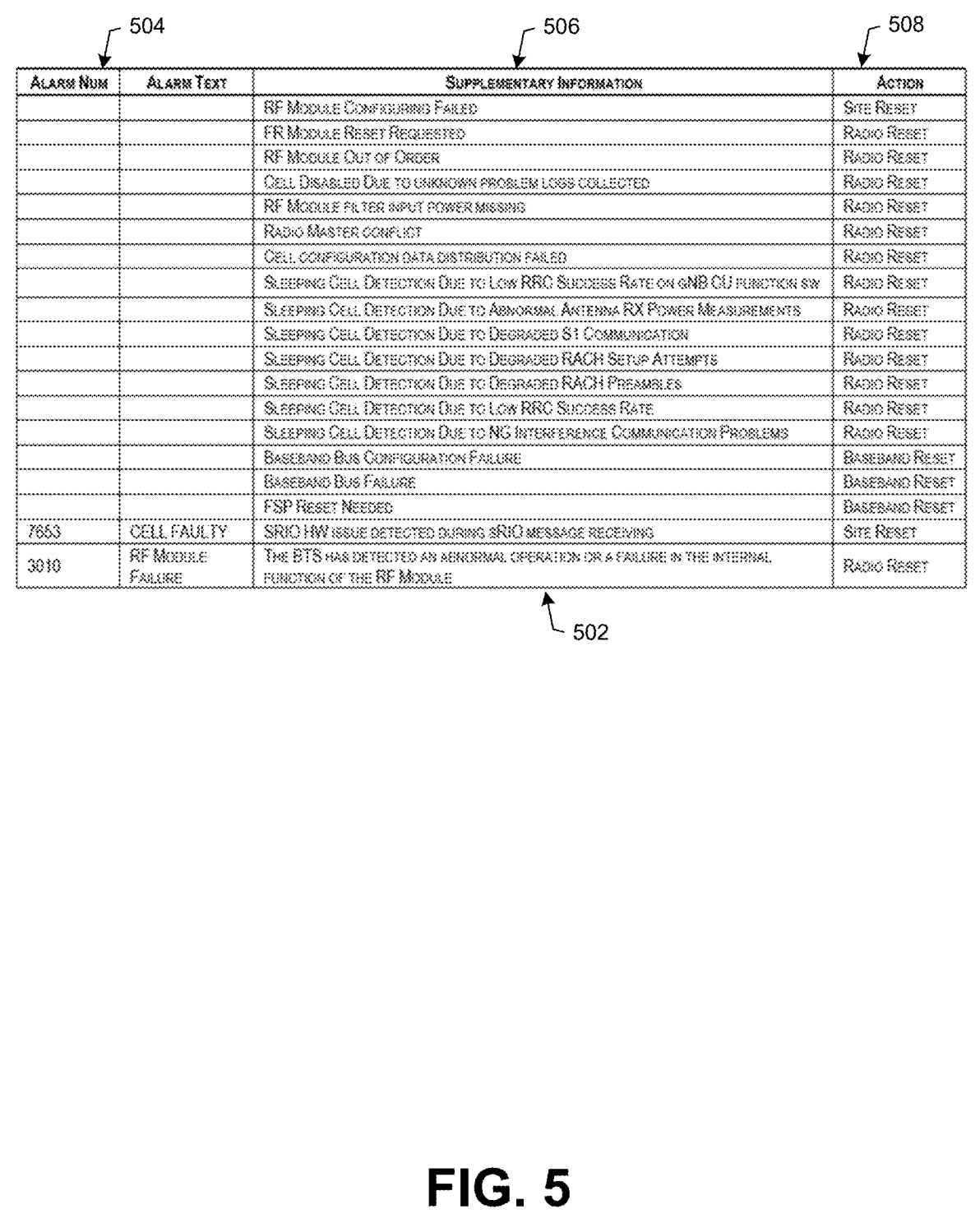

504                 506                 508

| Alarm Num | Alarm Text | Supplementary Information | Action |
|---|---|---|---|
| | | RF Module Configuring Failed | Site Reset |
| | | FR Module Reset Requested | Radio Reset |
| | | RF Module Out of Order | Radio Reset |
| | | Cell Disabled Due to unknown problem logs collected | Radio Reset |
| | | RF Module filter input power missing | Radio Reset |
| | | Radio Master conflict | Radio Reset |
| | | Cell configuration data distribution failed | Radio Reset |
| | | Sleeping Cell Detection Due to Low RRC Success Rate on gNB CU function sw | Radio Reset |
| | | Sleeping Cell Detection Due to Abnormal Antenna RX Power Measurements | Radio Reset |
| | | Sleeping Cell Detection Due to Degraded S1 Communication | Radio Reset |
| | | Sleeping Cell Detection Due to Degraded RACH Setup Attempts | Radio Reset |
| | | Sleeping Cell Detection Due to Degraded RACH Preambles | Radio Reset |
| | | Sleeping Cell Detection Due to Low RRC Success Rate | Radio Reset |
| | | Sleeping Cell Detection Due to NG Interference Communication Problems | Radio Reset |
| | | Baseband Bus Configuration Failure | Baseband Reset |
| | | Baseband Bus Failure | Baseband Reset |
| | | FSP Reset Needed | Baseband Reset |
| 7653 | CELL FAULTY | SRIO HW issue detected during sRIO message receiving | Site Reset |
| 3010 | RF Module Failure | The BTS has detected an abnormal operation or a failure in the internal function of the RF Module | Radio Reset |

| Site ID | MRBTS ID | LTE | RMOD DN | BBMOD DN |
|---|---|---|---|---|
|  | MRBTS-39553 |  |  |  |
|  | MRBTS-101230 |  |  |  |
| CH12345A |  | Y |  |  |
|  |  |  | PLMN-T2OSS/MRBTS-24013/EQM_R-1/APEQM_R-1/RMOD_R-6 |  |
|  |  |  |  |  |
|  |  |  |  |  |

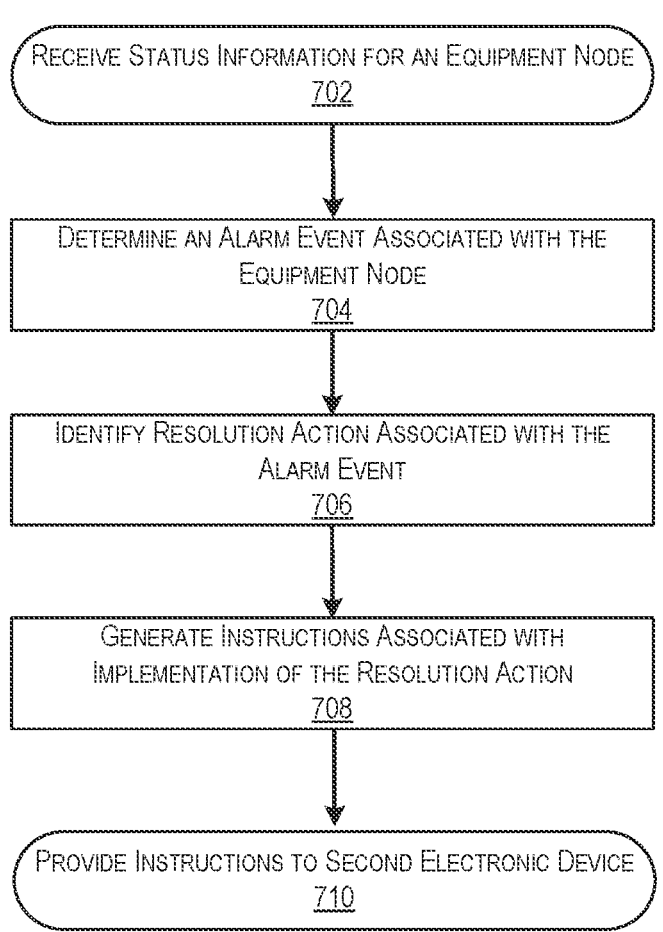
FIG. 7

CELLULAR SITE RESET TOOL BASED ON ALARMS OR USER INPUT FILE

BACKGROUND

Cellular networks are frequently used to enable communication between various mobile devices. In a cellular network (such as the Global System for Mobile communication (GSM) and TETRA (TErrestrial Trunked RAdio)), a geographical region is divided into a number of cells, each of which is served by a base station (also referred to as a Base Transceiver Station (BTS)). Such cellular networks are typically made up of a number of base stations that are geographically distributed throughout the geographical region in a way that maximizes wireless transmission coverage for the cellular network. In such cellular networks, a cluster of geographically-proximate base stations may be managed locally by a computing device running an Operations Support System (OSS). Such a computing device may manage the cluster of base stations based on communications with a network management device. However, in cellular networks having thousands of base stations, detection and mitigation of issues associated with a single base station can be difficult.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 depicts a block diagram representing an example of alarm data that may be implemented in accordance with some embodiments.

FIG. 6 depicts a block diagram representing an example of an input file that can be generated for use by a third-party service provider in managing alarm event mitigation.

FIG. 7 depicts a flow diagram illustrating an exemplary process for mitigating equipment nodes issues/failures in accordance with at least some embodiments.

DETAILED DESCRIPTION

Figure 1:
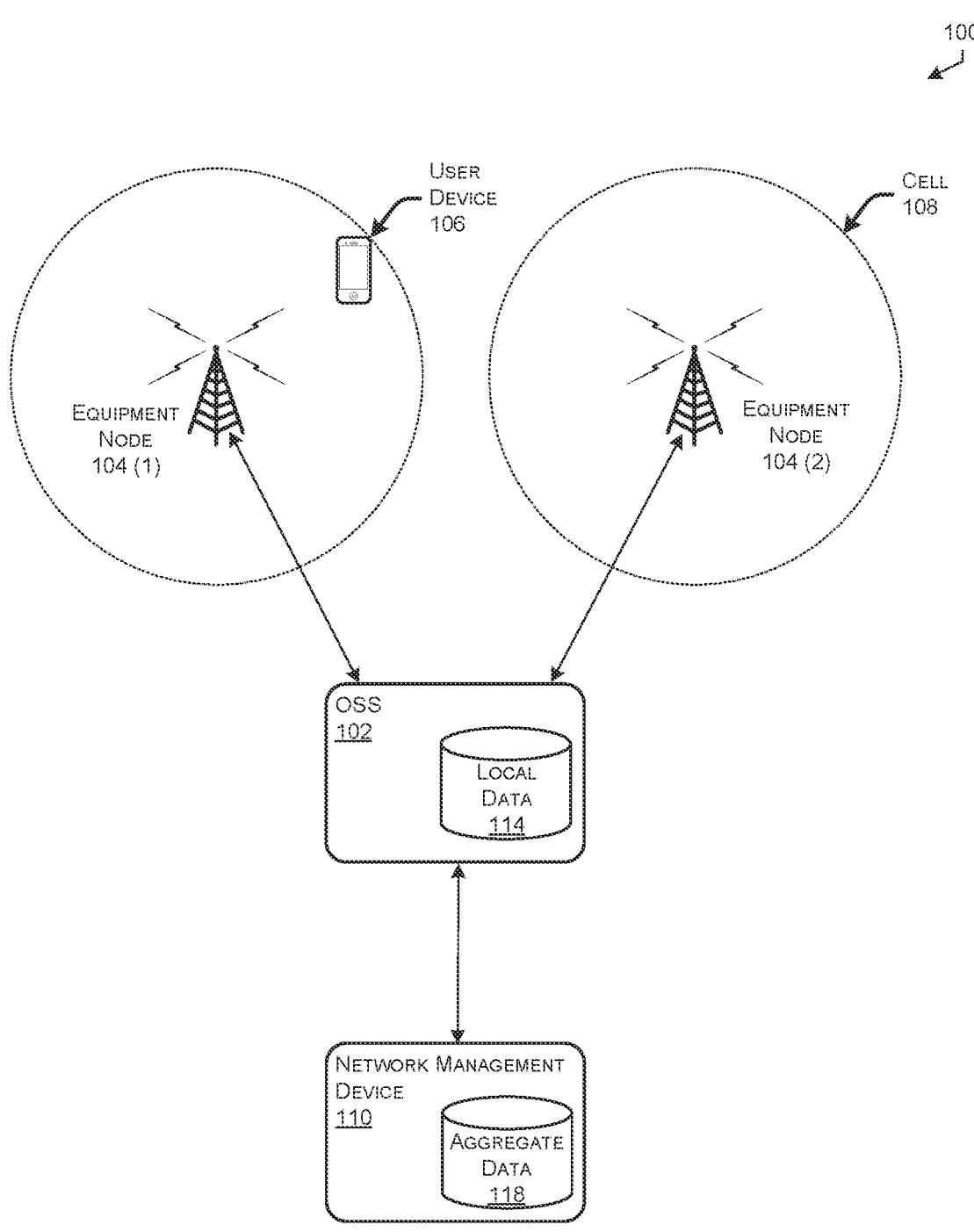
FIG. 1 depicts an example environment in which equipment failures can be predicted and mitigated in accordance with some embodiments.

This disclosure describes techniques that may be performed to provide hardware configuration updates for a number of equipment nodes to a network management device in an optimal manner. The techniques may be performed between a number of network components, such as equipment nodes (e.g., base stations and other hardware components), a computing device operating an OSS that manage equipment nodes in a region, and a network management device.

In embodiments, a network management device may receive and aggregate information about alarm events (e.g., outages and other issues) experienced by equipment nodes (e.g., base stations) operating on a network (e.g., a cellular network). Based on such data, the network management device may be configured to correlate alarm events with various conditions associated with (e.g., leading up to) those alarm events. The network management device may generate, based on such correlations, alarm data to be provided to computing devices that manage operations of the various equipment nodes.

When a computing device that manage operations of the various equipment nodes receives status information from an equipment node, that status information (or portions thereof) is compared to information included in the alarm data to predict an occurrence of an alarm event for the equipment node. If such an alarm event is predicted, the computing device may retrieve information about a resolution action to be taken by the equipment node in order to prevent (or otherwise mitigate) the predicted alarm event at the equipment node. For example, this may involve restarting one or more components/modules implemented within the equipment node or resetting the equipment node itself.

In some embodiments, the computing device that manages operations of an equipment node may generate instructions to be executed by that equipment node. In some embodiments, operations of equipment nodes may be managed by a third-party (e.g., unaffiliated) service provider. In such embodiments, the instructions may be generated in a format that can be used as input to the third-party service provider. For example, instructions may be generated as an input file that can be consumed by an application programming interface for the third-party service provider. In another example, the instructions may be generated as text-based input that can be entered into a text field for the third-party service provider.

Embodiments of the disclosure provide for a number of advantages over conventional systems. For example, when implemented, the system may provide the ability to predict and mitigate issues with equipment nodes before those issues become more problematic. Additionally, the system is able to correlate each detected issue with a solution that is known to resolve that issue, resulting in a higher occurrence of issue mitigation.

In some embodiments, a third-party service may be used to manage operations of the equipment nodes operating on a network. In such embodiments, the system described herein may be implemented in parallel to the third-party service in order to provide alarm event prediction, which may not be available through the third-party service. When an alarm event is detected, the system may generate instructions that are formatted in accordance with the third-party system for easy input/consumption by that third-party system.

FIG. 1 depicts an example environment in which equipment failures can be predicted and mitigated in accordance with some embodiments. In the system 100 depicted in FIG. 1, an Operations Support System (OSS) 102 may be in communication with a number of equipment nodes 104 (e.g., equipment nodes 104 (1-2)). In some embodiments, the equipment nodes 104 may include one or more base stations that provide service (e.g., cellular data service) to a user device 106 within a cell 108 that defines a geographic area. The OSS 102 is in further communication with a network management device 110 configured to aggregate and manage information about a network (e.g., a cellular network).

An Operations Support System (OSS) 102 serves as a central point for administration, management, and provisioning of network elements located in a geographical region. An OSS 102 may be deployed to manage a number of equipment nodes 104 (e.g., base stations) within one of multiple geographic regions. Among other things, the OSS 102 administers the configurations/settings for the equipment nodes 104 in order to optimize network coverage in its respective geographic region. In embodiments, the OSS 102 may be configured to provide instructions to an equipment node 104 (e.g., a base station) to cause one or more components (either hardware or software components) to be reset/restarted.

In embodiments, the OSS 102 is configured to receive and/or manage a variety of status information received from each of the equipment nodes 104. For example, the OSS 102 may receive information about a transmission power setting used by an equipment node 104 in communicating with various user devices. In another example, the OSS 102 may receive information about a radio frequency that a base station in communicating with various user devices. The OSS 102 may receive information about one or more user device 106 operating on the network that includes the equipment node 104. For example, such information may include details about operations/actions performed at the user device. In another example, such information may include information about one or more Key Performance Indicators (e.g., KPIs) related to network traffic generated by one or more user device 106 operating on the network.

The OSS 102 may be configured to store configuration parameters received from the equipment nodes as local data 114. In some embodiments, information is relayed to the OSS 102 for a number of equipment nodes 104 (1-2). In these embodiments, the OSS 102 may provide desired instructions and/or configuration settings to particular equipment nodes 104.

The OSS 102 may be further configured to transmit change messages 116 that include an indication of changes in information (e.g., configuration parameters) associated with the equipment nodes 104 stored as local data 114 to the network management device 110. The network management device 110 may store such information received from a number of OSS devices as aggregate data. Such aggregate data may be used to optimize operation of a network (e.g., a cellular data network). In embodiments, the OSS 102 maintains information about outages for equipment nodes 104.

An equipment node 104 may include any suitable type of electronic equipment configured to perform one or more functions in accordance with instructions received from an OSS 102. As previously described, an equipment node 104 may be a base station that includes one or more transmission mechanisms (e.g., a radio transceiver) capable of enabling wireless communication with a number of user devices. Such base stations may be distributed over an area in a sufficiently dense manner such that user devices (e.g., mobile communication devices) in communication with the network can communicate with each other or with a terrestrial network. The equipment node 104 may include a lot of parameters to control the features and functions, it report the measurements by counters send to OSS 102 every 15 mins or 1 hour (user define in OSS 102). By the counters stored in OSS 102 database, the network engineer can know which site has issues (e.g., user have bad call experience) for example, high drop call rates or high access failures In embodiments, an equipment node 104 may include a number of components configured to perform functions. For example, the equipment node 104 may include various hardware modules that are each configured to perform a function. In another example, the equipment node 104 may include one or more software modules configured to manage operation of the various hardware modules.

A network system (e.g., a cellular network) in which the system 100 is implemented may provide network services to one or more user devices 106 via a base station (e.g., equipment node 104). The user device 106 may include any electronic device capable of interacting with a mobile network. In some non-limiting examples, the user device 106 may be a variety of devices including, for example: a mobile phone, a personal data assistant (PDA), or a mobile computer (e.g., a laptop, notebook, notepad, tablet, etc.) having mobile wireless data communication capability.

A network management device 110 may include any suitable computing device configured to manage operation of a network (e.g., a cellular network) as implemented herein. The network management device 110 may maintain aggregate data that includes information about a current status of each of the equipment nodes 104 (1-2) in the network in which the system 100 is implemented.

The illustrative system 100 may be implemented within a mobile wireless network that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a user device 106 depicted in FIG. 1 carrying out wireless communications via a base station (also referred to as a base transceiver station or cell site). Such a mobile wireless network system may include hundreds or thousands of such stations.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
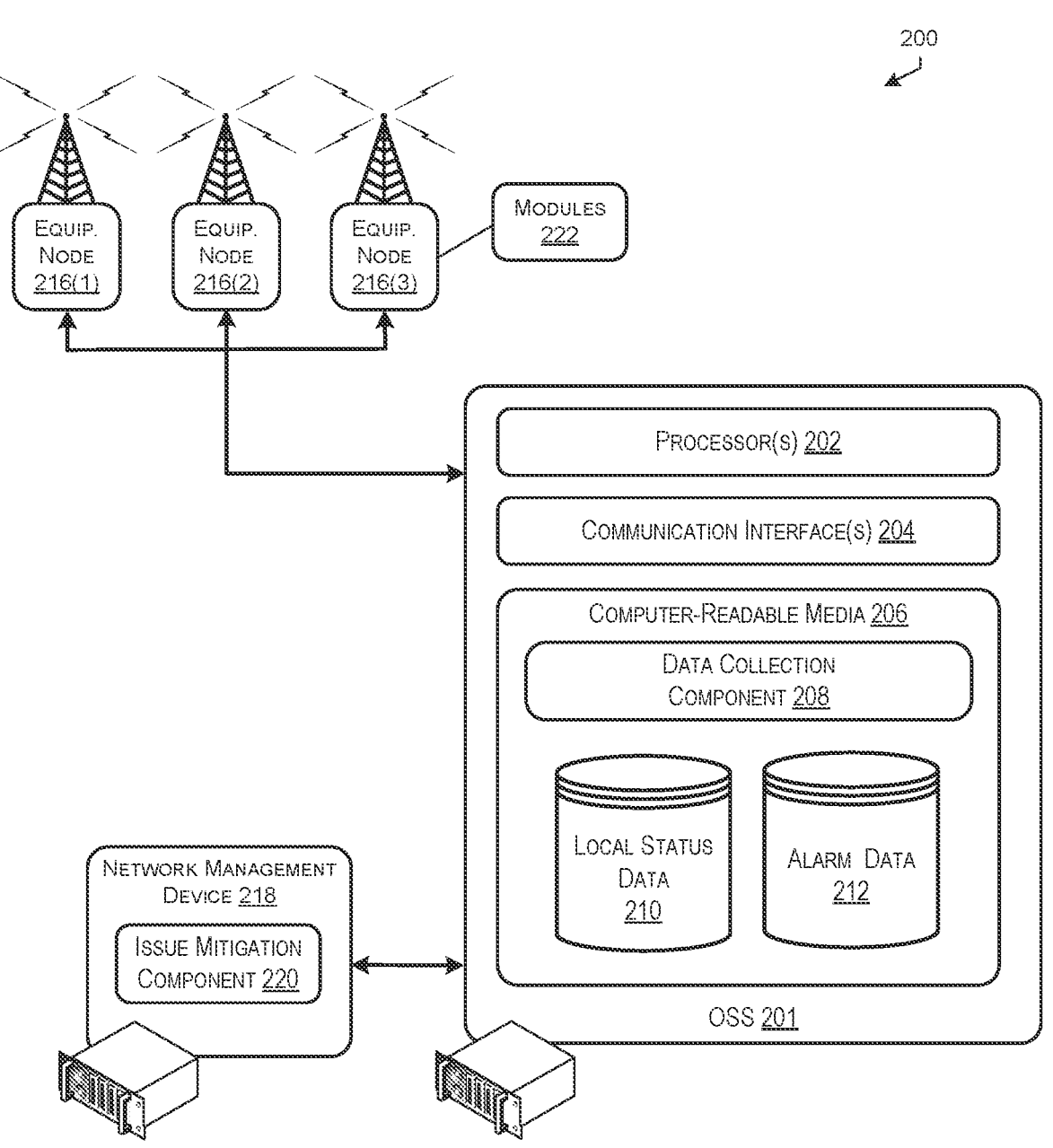
FIG. 2 depicts a component diagram of an example system to be implemented in a network in order to predict and mitigate equipment outages in accordance with at least some embodiments.

FIG. 2 depicts a component diagram of an example system to be implemented in a network in order to predict and mitigate equipment outages in accordance with at least some embodiments. As depicted in FIG. 2, an OSS 201 is in communication with equipment nodes 216 (1-3). Additionally, the OSS 102 may be further in communication with a network management device 218.

The exemplary OSS 201 may be an example of the OSS 102 as described in relation to FIG. 1 above. It should be noted that the OSS (or any other described computing component) may include a single computing device (e.g., a server device) or a combination of computing devices. In some cases, the OSS may be implemented as a virtual system (e.g., via virtual machines implemented within a cloud computing environment).

As illustrated, the OSS 102 may include one or more hardware processors 202 configured to execute one or more stored instructions. Such processor(s) 202 may comprise one or more processing cores. Further, the OSS 102 may include one or more communication interfaces 204 configured to provide communications between the OSS 102 and other devices, such as the network management device 218, or any other suitable electronic device.

The OSS 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the OSS 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the OSS 102 to perform various operations described herein. For example, the computer-readable media 206 may include some combination of components configured to implement the described techniques. Particularly, the OSS 102 may include a component configured to perform data collection in relation to a number of equipment nodes of a network (e.g., data collection component 208). Additionally, the computer-readable media 206 may further maintain one or more databases, such as a database of status information for equipment nodes included within a region managed by the OSS (e.g., local status data 210) as well as a database of information about mappings between detected conditions and alarm events (alarm data 212).

A data collection component 208 may be configured to, when executed by the processor(s) 202, receive status information related to one or more equipment nodes 216 and update a status of the respective equipment node within local status data 210. In some embodiments, status information for an equipment node 216 may be relayed to the OSS 201 via a base station controller 214. In some cases, such status information may be obtained via one or more sensors installed upon (or in the vicinity of) the equipment node 216, and may include any suitable data related to the equipment node. For example, status information may indicate a current power transmission level, a transmission frequency (or band of frequencies), an antenna angle, a temperature, etc. In some cases, such information may be obtained from a device in communication with the equipment node, such as a router or other suitable electronic device. The information may include data about metrics obtained in relation to network traffic generated by the equipment node. The received status information is then stored in relation to the respective equipment node 216.

The OSS 201 may provide change messages to the network management device 218 in real time (or substantially real time) as status information is received. The network management device 218 may, as noted elsewhere, maintain a database of aggregate data that includes status information for each of the equipment nodes 216 in the network. Upon receiving status information, the network management device may be configured to update one or more appropriate database entries to reflect information included within the change message.

In embodiments, the network management device 218 may include one or more modules configured to detect and mitigate issues with an equipment node (e.g., issue mitigation component 220). In embodiments, information about equipment node outages, as well as status information relating to the equipment nodes leading up to such outages, may be used to train a machine learning model to correlate equipment node metrics/trends to equipment node outages. Additionally, the network management device 218 may be further trained to correlate a particular issue identified at each equipment node with a resolution to that issue. For example, in addition to being provided an indication of an issue (alarm event) that occurred at an equipment node, the machine learning model may also be provided with a resolution that was used to resolve that alarm event.

In embodiments, the trained machine learning model may be used to generate alarm data 212 that is provided to multiple OSS 201 that are geographically distributed throughout a network. In these embodiments, alarm data 212 may include information about conditions that have been correlated to an impending equipment node outage/issue (e.g., an alarm event). Additionally, the alarm data 212 may further include information about a resolution associated with that alarm event. The OSS 201 may be configured to compare information received in relation to a particular equipment node to the conditions indicated in the alarm data 212 in order to predict an issue being likely to occur with that particular equipment node. Upon predicting that an issue is likely to occur at an equipment node, the OSS 201 may be configured to take one or more steps based on a resolution indicated in the alarm data 212.

By way of example, the OSS 201 may use alarm data 212 to, based on metrics received in relation to a base station, determine that an outage is likely to occur for that base station. Upon making such a determination, the OSS 201 may identify a resolution operation that is predicted to result in preventing the outage. The OSS 201 may then generate instructions in line with the identified resolution that are then provided to the base station to be executed. For example, the OSS 201 may generate instructions that, when provided to the base station, causes the base station to reset/restart a module associated with the predicted outage.

As noted elsewhere, an equipment node 216 may include a number of modules 222 (e.g., hardware and/or software modules) that are configured to perform particular functions. For example, each equipment node 216 may include a radio module configured to enable communication between the equipment node 216 and other electronic devices. In another example, each equipment node 216 may include a baseband module that manages all radio functions for the equipment node 216. The equipment node 216 may be configured to reset or restart one or more of the modules 222 upon receiving instructions from OSS 201.

Figure 3:
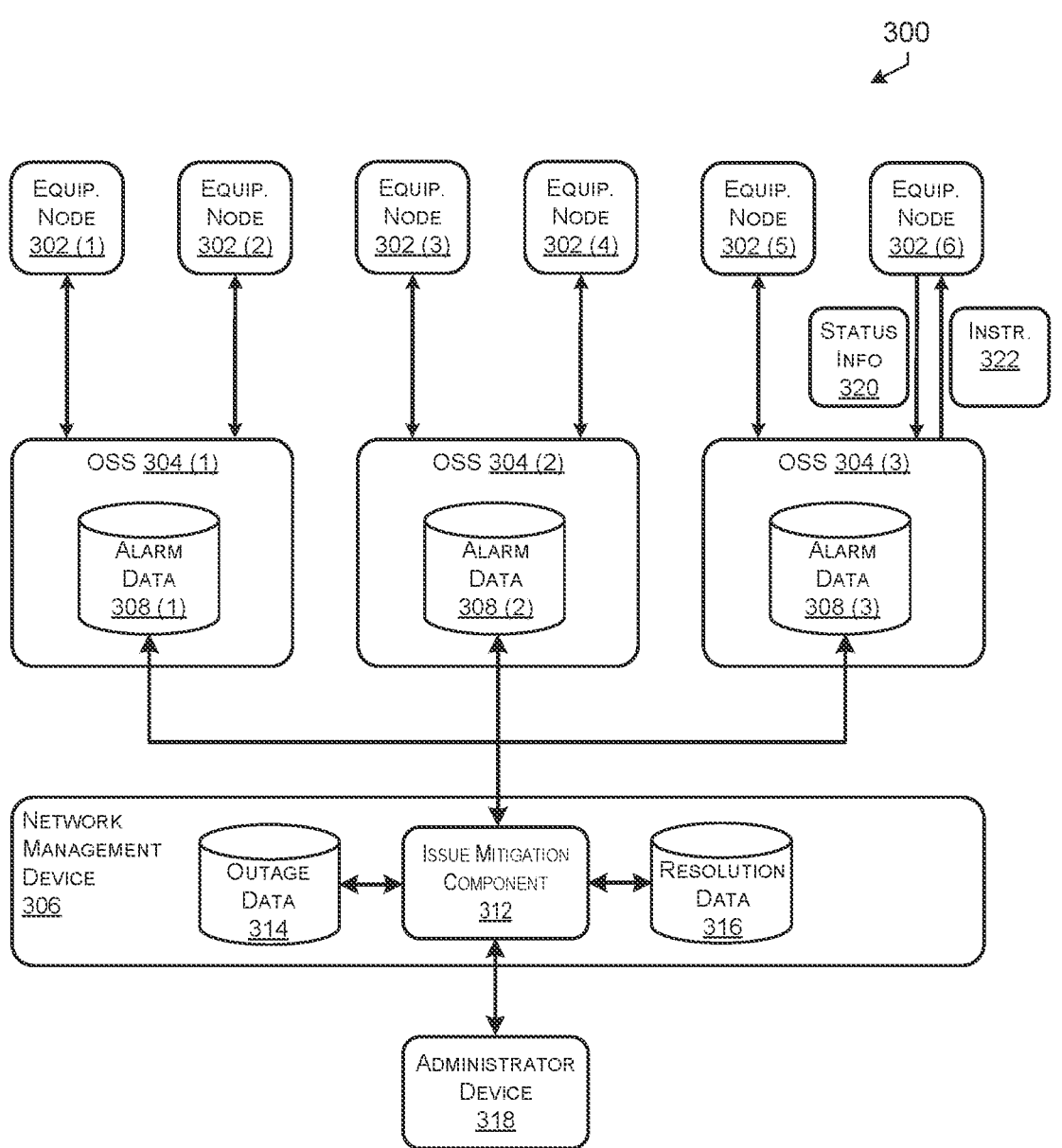
FIG. 3 depicts a block diagram illustrating a network upon which a process for predicting and mitigating equipment node outages can be implemented in accordance with some embodiments.

FIG. 3 depicts a block diagram illustrating a network upon which a process for predicting and mitigating equipment node outages can be implemented in accordance with some embodiments. In the exemplary network 300, a number of equipment nodes (e.g., base stations) 302 (1-6) are configured to communicate with a number of computing devices each running an OSS 304 (1-3). The number of computing devices operating OSS 304 may be further in communication with a network management device 306. In embodiments, the OSS 304 may maintain alarm data 308 (1-3) that maintains information about one or more conditions indicative of an alarm event as well as information about an appropriate resolution associated with the alarm event.

As noted elsewhere, a network management device 306 may include an issue mitigation component 312 configured to associate one or more conditions with an issue (e.g., an alarm event) as well as with a resolution to that issue. The issue mitigation component 312 may be an example of the issue mitigation component 220 as described in FIG. 2 above. In embodiments, network management device 218 may store information about equipment outages (e.g., outage data 314). Such information may include an indication of metrics attributed to the equipment leading up to the outage. In some embodiments, the network management device 306 may maintain resolution data 316 that includes an indication of a resolution that was used to resolve a type of issue/outage. Each of the outage data 314 and the resolution data 316 may be used by the issue mitigation component 312 in order to generate alarm data 308 to be provided to each OSS 304. As noted elsewhere, the issue mitigation component 312 may use one or more machine learning models that is trained using the outage data 314 and/or the resolution data 316.

In some embodiments, the network management device 306 may be in communication with an administrator device 318. Such an administrator device 318 may be operated by an administrative user, such as an authorized representative of an entity associated with the network. In some cases, when an alarm event is detected by an OSS 304, information about the alarm event/proposed resolution may be provided to the administrator device 318 for authorization/approval. In these cases, the proposed resolution may only be implemented by an OSS 304 upon receiving approval from an administrator device 118. In some cases, alarm data 308 that is provided to an OSS 304 may be generated by an administrator user operating the administrator device 318 rather than by the network management device 306.

In an exemplary process implemented on the network 300, status information 320 related to an equipment node 302 (6) is received at a respective OSS 304 (3) associated with that equipment node. That status information 320, or some portion of it, is then compared to information included in the alarm data 308 (3) in order to identify one or more alarm events that may be predicted to occur based on conditions indicated in the status information 320. For example, an alarm event may be identified as likely to occur if certain metric values included in the status information 320 fall below a threshold value (as indicated in the alarm data 308) associated with that metric. Additionally, upon identification of an alarm event by the OSS 304 (3), a resolution associated with that alarm event is also identified (e.g., from alarm data 308 (3)).

In some cases, the status information 320 may include an indication of an alarm event that has already occurred. For example, the status information 320 may include an indication of an alarm event identifier (e.g., an alarm code) associated with the alarm event that has occurred. In such cases, the alarm data 308 provided to the OSS 304 may further include an alarm event identifier.

In some cases, the OSS 304 (3) may be configured to implement the proposed resolution automatically (e.g., without human interaction). This may involve generating computer-executable instructions 322 based on the proposed resolution and providing those computer-executable instructions to the equipment node 302 (6) to be executed.

In some cases, the OSS 304 (3) may be configured to provide information about the identified alarm event and proposed resolution to an administrator device 318. In such cases, the administrator device 318 may be configured to present the information about the identified alarm event and proposed resolution to a user (e.g., an administrative user). The user may provide approval to implement the proposed resolution to the network management device 306, which may relay the approval to the OSS 304 (3). Upon receiving such approval, the OSS 304 (3) may generate computer-executable instructions 322 based on the proposed resolution and provide those computer-executable instructions to the equipment node 302 (6) to be executed.

Upon receiving instructions 322, the equipment node 302 (6) is configured to execute those instructions. In some cases, this may involve restarting or resetting one or more modules implemented on the equipment node 302 (6). In some cases, this may involve restarting the entire equipment node 302 (6). In some cases, this may involve reconfiguring/updating one or more configuration settings used by the equipment node 302 (6).

Figure 4:
FIG. 4 depicts a block diagram illustrating an example process for predicting and mitigating issues on a network device in accordance with some embodiments.

FIG. 4 depicts a block diagram illustrating an example process for predicting and mitigating issues on a network device in accordance with some embodiments. The process 400 depicts interactions between components disclosed as being included in the network. Particularly, the process may involve interactions between at least one equipment node 302, an OSS 304, a network management device 306, and an administration device 310. Each of these components may be examples of the respective components described in relation to FIG. 3 above.

In the example process 400, operations performed by the equipment implemented within the network may be managed by a third-party service provider as accessed by an operation management device 402. For example, an operation management device 402 may be implemented within the network in order to manage operations of the equipment of the network. In this example, the operation management device 402 may be unaffiliated with an issue mitigation component as described herein. Accordingly, in the disclosed system the operation management device 402 may have sole authority over updates/restarts to equipment implemented within the network. Hence, any resolutions to such network equipment may be required to be implemented through the operation management device 402.

At 404 of the process 400, status information may be provided by an equipment node 302 (e.g., a base station) to an OSS 304 that manages operations associated with that equipment node 302.

At 406 of the process 400, upon receiving status information from an equipment node 302, the OSS 304 may compare the status information against one or more conditions associated with alarm events as maintained in alarm data stored at the OSS. In embodiments, the OSS may detect an alarm event based on such a comparison.

Upon detecting one or more alarm events, the OSS may identify a proposed resolution associated with the one or more alarm events. The OSS may then generate instructions that can be used to implement the proposed resolution. In some cases, the instructions may be generated in a format that is associated with the operation management device 402. For example, the instructions may be formatted as an input file that can be executed by the operation management device 402. In another example, the instructions may be formatted as a text input command that, when entered into a text field, may cause the operation management device 402 tom implement the proposed resolution. At 408 of the process 400, the OSS may forward the generated instructions to a network management device 306. Upon receiving such instructions, the network management device 306 may forward the instructions to an administrator device 318 at 410.

It should be noted that while an alarm event is described as being detected at an OSS 304, this step may be performed by the network management device 306 instead. Additionally, instructions related to a resolution of the detected alarm event may be generated by the network management device 306. In some cases, the generated instructions may relate to a proposed resolution to be implemented at multiple equipment nodes predicted to experience the same issue.

At 412 of the process 400, a user of the administrator device 318 may be presented with the instructions generated in relation to a detected alarm event. In some cases, the administrator device 318 may implement a graphical user interface (GUI) associated with the operation management device 402. An administrative user operating the administrator device 318 may provide the instructions to the operation management device 402 via such a user interface. In some cases, the administrative user may upload an input file that includes the instructions to the operation management device 402 to be implemented at 414. In some cases, the administrative user may copy text-based instructions into a text input field presented by the GUI.

At 416 of the process 400, the operation management device 402 receives the instructions provided by the administrative user of the administrator device 318. Upon receiving such instructions, the operation management device 402 may route the instructions to the OSS 304 relevant to the equipment node 302.

At 418 of the process 400, upon receiving instructions related to an equipment node, the OSS 304 may translate those instructions into computer-readable instructions that can be executed by the relevant equipment node. At 420 of the process 400, the OSS 304 provides the instructions to the equipment node, causing that equipment node to implement the resolution.

FIG. 5 depicts a block diagram representing an example of alarm data that may be implemented in accordance with some embodiments. The alarm data 502, depicted herein as information presented within a table, may be an example of the alarm data 212 included on an OSS device as described in relation to FIG. 2 above.

As noted elsewhere, alarm data 502 may include a number of data fields that are populated with data values related to various alarm events. For example, the alarm data 502 may include an alarm identifier field 504. In another example, the alarm data 502 may include a supplemental information field 506 that includes information about the alarm event. In some cases, the supplemental information field 506 may include an indication of one or more conditions that are indicative of the alarm event. In another example, the alarm data 502 may include an action field 508 that includes information about an action determined to mitigate the alarm event.

As noted elsewhere, an alarm event may be detected by an OSS (or alternatively by an equipment node) based on information obtained from an equipment node matching conditions associated with that alarm event (e.g., as indicated in one or more fields of the alarm data 502).

In some embodiments, the alarm data 502 may be generated automatically. For example, the alarm data 502 may be generated by a trained machine learning model that has been trained to correlate detected alarm events with various information as determined based on status information received from an equipment node.

In some embodiments, the alarm data 502 may be generated by a user, such as an administrator user associated with a cellular network. The alarm data 502 may be provisioned onto each of a multitude of OSS computing devices operating throughout a geographic region.

FIG. 6 depicts a block diagram representing an example of an input file that can be generated for use by a third-party service provider (e.g., an operation management device) in managing alarm event mitigation.

In embodiments, the input file 602, depicted herein as information presented within a table, may be generated as a text-based document in a format that is capable of being consumed by the third-party service provider. The input file may be generated by the system as described herein upon detecting one or more alarm events occurring at various base stations. Such an input file is provided to a user that can then provide the input file to the third-party service provider in order to mitigate the various alarm events occurring (or predicted to occur) at the various base stations.

In embodiments, an input file 602 may include a number of data value fields that are populated with data values related to mitigation of various alarm events. In embodiments, such data value fields may include one or more identifier fields 604. For example, equipment nodes may be identified by a site identifier and/or another suitable identifier such as a Multi Radio Base Transceiver Station (MRBTS) identifier.

In some embodiments, the data value fields may include an indication of one or more networks supported by the respective base stations (e.g., network indicator 606). Additionally, an input file 602 may include data value fields indicative of modules and/or commands to be executed by the respective modules (e.g., module indicator 608). For example, the input file 602 may include an indication of a command to be executed by a radio module or a baseband module. In embodiments, commands to be executed by one or more modules may be generated by the system as described herein based on information maintained about the various modules (e.g., version, etc.) included on each base station as well as an action determined to mitigate an alarm event.

FIG. 7 depicts a flow diagram illustrating an exemplary process for mitigating equipment nodes issues/failures in accordance with at least some embodiments. The process 700 may be performed by a network management device, such as the network management device 110 as described in relation to FIG. 1 above.

At 702, the process 700 may involve receiving status information from an equipment node. In embodiments, the status information includes metric values associated with the operation of the equipment node.

At 704, the process 700 may involve determining an alarm event associated with the equipment node based on the received status information. In some embodiments, this may involve comparing one or more metric values indicated in the status information with conditions indicated in alarm data stored in memory.

At 706, the process 700 may involve identifying a resolution action associated with the alarm event. A resolution action may be indicated in alarm data stored in memory and may indicate an action to be taken to mitigate (e.g., lessen, prevent, or resolve) an issue associated with a corresponding alarm event. For example, the resolution action may include an action to restart at least one component of the equipment node. In another example, the resolution action may be an action to perform a reset of the equipment node.

At 708, the process 700 may involve generating instructions associated with implementation of the resolution action. In embodiments, the instructions may include one or more computer-executable commands to be executed by the equipment node.

At 710, the process 700 may involve providing the generated instructions to at least one second electronic device. In some embodiments, the instructions may be provided to the equipment node in order to cause the equipment node to execute the resolution action. In some embodiments, the instructions may be provided to an administrator device operated by a user (e.g., an administrative user) associated with a network on which the equipment node is implemented.

In embodiments in which the instructions are provided to an administrator device, the user is able to use the instructions to cause the equipment node to execute the resolution action. In some cases, operations of equipment nodes in a network may be managed by an operation management service, which might be a third-party service that is unaffiliated with embodiments of the system as described herein. In embodiments, a GUI associated with the operation management service may be implemented on the administrator device to which the instructions have been sent. For example, the administrator device may execute a software application associated with the operation management service.

In the above cases, the instructions may be generated in a format associated with (e.g., supported by) the operation management service. For example, the instructions may be formatted as an input file to be provided to the operation management service. In another example, the instructions may be formatted as text to be entered (e.g., copied and pasted) into an input field associated with the operation management service.

Figure 8:
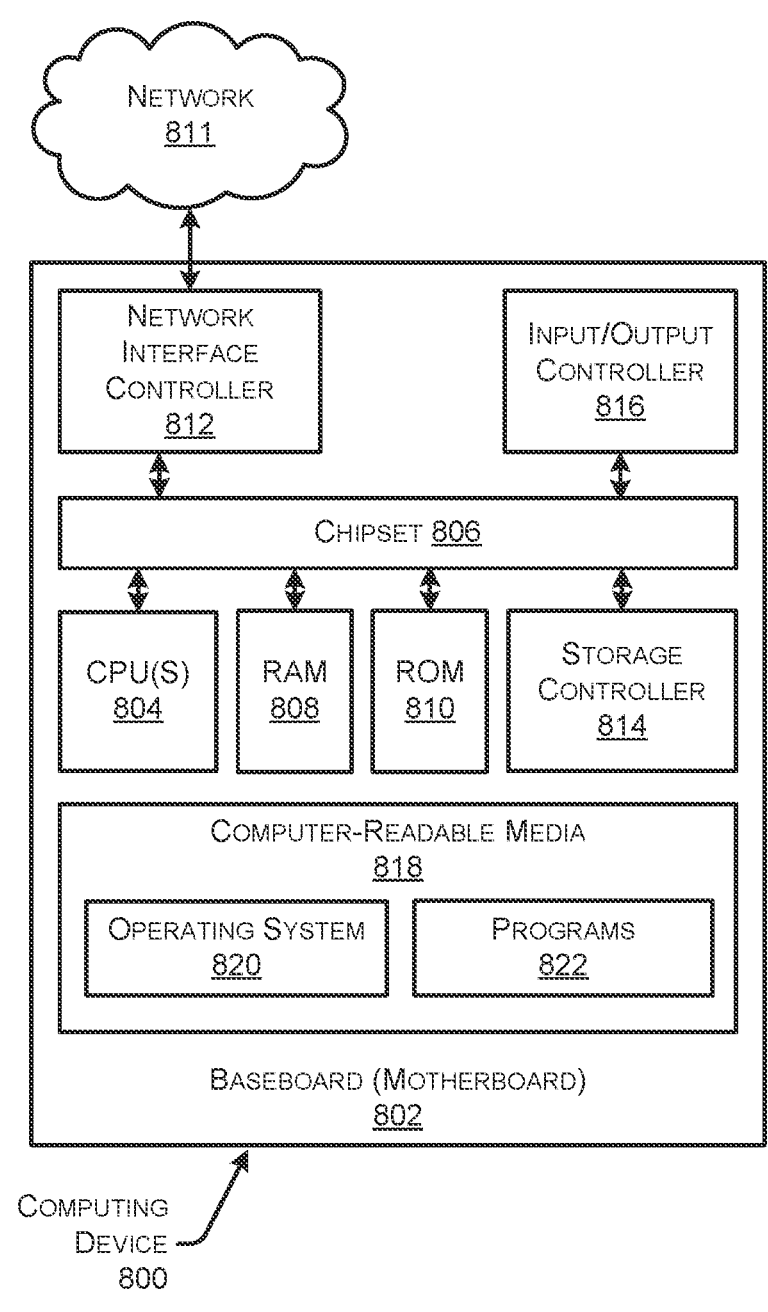
FIG. 8 shows an example computer architecture for a computing device capable of executing program components for implementing the functionality described above.

FIG. 8 shows an example computer architecture for a computing device 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computing device 800 may, in some examples, correspond to a physical server as described herein, and may comprise networked devices such as servers, switches, routers, hubs, bridges, gateways, modems, repeaters, access points, etc.

The computing device 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 800. The chipset 806 can further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM can also store other software components necessary for the operation of the computing device 800 in accordance with the configurations described herein.

The computing device 800 can operate in a networked environment using logical connections to remote computing devices and computer systems through a network, such as the network 811. The chipset 806 can include functionality for providing network connectivity through a NIC 812, such as a gigabit Ethernet adapter. The NIC 812 is capable of connecting the computing device 800 to other computing devices over the network 811. It should be appreciated that multiple NICs 812 can be present in the computing device 800, connecting the computer to other types of networks and remote computer systems.

The computing device 800 can be connected to a storage device 818 that provides non-volatile storage for the computer. The storage device 818 can store an operating system 820, programs 822, and data, which have been described in greater detail herein. The storage device 818 can be connected to the computing device 800 through a storage controller 614 connected to the chipset 806. The storage device 818 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 800 can store information to the storage device 818 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 can further read information from the storage device 818 by detecting the physical states or characteristics of one or more particular locations within the physical storage units.

In addition to the mass storage device 818 described above, the computing device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 800. In some examples, the operations performed by devices as described herein may be supported by one or more devices similar to computing device 800. Stated otherwise, some or all of the operations performed by an edge device, and/or any components included therein, may be performed by one or more computing device 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 800.

In one embodiment, the storage device 818 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various processes described above with regard to the other figures. The computing device 800 can also include computer-readable storage media having instructions stored thereupon for performing any of the other computer-implemented operations described herein.

The computing device 800 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 800 might not include all of the components shown in FIG. 8, can include other components that are not explicitly shown in FIG. 8, or might utilize an architecture completely different than that shown in FIG. 8.

As described herein, the computing device 800 may include one or more hardware processors (processors), such as CPU 804, configured to execute one or more stored instructions. The processor(s) (e.g., CPU 804) may comprise one or more cores. Further, the computing device 800 may include one or more network interfaces configured to provide communications between the computing device 800 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 811. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 822 may comprise any type of programs or processes to perform the techniques described in this disclosure. The programs 822 may comprise any type of program that cause the computing device 800 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, a PE module may also include computer executable instructions that, when executed by processor(s), cause computing device 1002 to perform the techniques described herein. To do so, in some embodiments, a module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, one or more module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving status information associated with an equipment node;
   determining, based on the status information and stored alarm data, an alarm event associated with the equipment node;
   identifying, based on the stored alarm data, a resolution action associated with the alarm event, wherein the resolution action is at least one of a radio reset, a baseband reset, or a restart of at least one component of the equipment node;
   generating instructions associated with implementation of the resolution action; and
   providing the instructions to the equipment node or at least one electronic device associated with the equipment node to be executed.

2. The method of claim 1, wherein the instructions are provided to an administrator device operated by an administrative user of a network that includes the equipment node.

3. The method of claim 2, wherein operation of the equipment node on the network is managed by an operation management service, and wherein the instructions are formatted for use with the operation management service.

4. The method of claim 3, wherein the instructions are formatted as an input file to be provided to the operation management service.

5. The method of claim 3, wherein the instructions are formatted as text to be entered in an input field associated with the operation management service.

6. The method of claim 5, wherein the input field is presented on the administrator device within a graphical user interface associated with the operation management service.

7. The method of claim 1, wherein the status information includes metric values associated with a performance of the equipment node.

8. A computing device comprising:
   one or more processors; and
   one or more non-transitory computer-readable media storing computer-executable instructions that, when executed by the one or more processors, cause computing device to perform operations comprising:

receiving status information associated with an equipment node;

determining, based on the status information and stored alarm data, an alarm event associated with the equipment node;

identifying, based on the stored alarm data, a resolution action associated with the alarm event, wherein the resolution action is at least one of a radio reset, a baseband reset, or a restart of at least one component of the equipment node;

generating instructions associated with implementation of the resolution action; and providing the instructions to the equipment node to be executed.

9. The computing device of claim 8, wherein the instructions comprise one or more computer-executable commands to be executed by the equipment node.

10. The computing device of claim 8, wherein the instructions are provided to an administrator device as text to be provided to a third-party service.

11. The computing device of claim 8, wherein the status information comprises information about one or more actions performed by the equipment node.

12. The computing device of claim 11, wherein the status information includes metric values obtained during a performance of the one or more actions by the equipment node.

13. One or more non-transitory computer-readable media storing computer-executable instructions that, when executed by one or more processors, cause the one or more processors to perform operations comprising:

receiving status information associated with an equipment node;

determining, based on the status information and stored alarm data, an alarm event associated with the equipment node;

identifying, based on the stored alarm data, a resolution action associated with the alarm event, wherein the resolution action is at least one of a radio reset, a baseband reset, or a restart of at least one component of the equipment node;

generating instructions associated with implementation of the resolution action; and providing the instructions to the equipment node to be executed.

14. The one or more non-transitory computer-readable media of claim 13, wherein the operations further comprise providing an indication of the alarm event and the resolution action to an administrator device, and wherein the instructions are provided to the equipment node in response to receiving approval from the administrator device.

* * * * *